United States Patent
Rotermund et al.

(10) Patent No.: US 6,274,642 B1
(45) Date of Patent: *Aug. 14, 2001

(54) STORAGE-STABLE, BLOWING AGENT-CONTAINING EMULSIONS FOR PRODUCING RIGID FOAMS BASED ON ISOCYANATE

(75) Inventors: Udo Rotermund, Ortrand; Anja Biedermann, Senftenberg; Renate Hempel, Ruhland; Werner Wiegmann, Rahdem; Marion Heinz, Bernsdorf, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/160,109

(22) Filed: Sep. 24, 1998

(30) Foreign Application Priority Data

Sep. 24, 1997 (DE) ............................................. 197 42 011

(51) Int. Cl.$^7$ ...................................................... C08J 9/14
(52) U.S. Cl. ........................ 521/174; 521/130; 521/131; 252/182.24; 252/182.27
(58) Field of Search .................................. 521/131, 174, 521/130; 252/182.27, 182.24

(56) References Cited

U.S. PATENT DOCUMENTS

| 5,428,077 | 6/1995 | Lamberts et al. . |
| 5,488,071 | * 1/1996 | Patterson .............................. 521/174 |

FOREIGN PATENT DOCUMENTS

| 43 28 383 | 8/1993 | (DE) . |
| 196 10 262 | 3/1996 | (DE) . |
| WO 92/16573 | 3/1992 | (WO) . |

* cited by examiner

Primary Examiner—John M. Cooney, Jr.
(74) Attorney, Agent, or Firm—Fernando A. Borrego

(57) ABSTRACT

Storage-stable, blowing agent-containing halogen-free emulsions for producing rigid foams based on isocyanate comprise a) compounds containing hydrogen atoms which are reactive toward isocyanate groups,
b) water,
c) physically acting, halogen-free blowing agents and, if desired,
d) auxiliaries and/or additives which are customary in polyurethane chemistry, wherein the component a) comprises polyether alcohols having a functionality of greater than 1.5 and a hydroxyl number of from 10 to 100 mg KOH/g in an amount of from 0.2% by mass to 80% by mass, based on the mass of the component a), and the halogen-free, physically acting blowing agents c) used are hydrocarbons having from 3 to 10 carbon atoms.

10 Claims, No Drawings

STORAGE-STABLE, BLOWING AGENT-CONTAINING EMULSIONS FOR PRODUCING RIGID FOAMS BASED ON ISOCYANATE

The present invention relates to storage-stable, blowing agent-containing emulsions for producing rigid foams based on isocyanate.

The production of rigid foams based on isocyanate and their use as thermal insulation material has been known for a long time and is widely described in the literature. As chemical structures formed from the isocyanate groups, these foams can comprise polyurethanes, polyureas, polyisocyanurates and also further isocyanate adducts such as allophanates, biurets, carbodiimides and their isocyanate adducts, oxazolidines, polyimides, polyamides, etc. The type of these structures is controlled by the reaction partners of the isocyanates, the catalysis and the reaction conditions. These isocyanate adducts are usually summarized under the term polyurethanes (PUR) since the polyurethanes are the most widespread and most important group of materials among the polyisocyanate adducts. Rigid foams based on isocyanate are therefore frequently referred to as rigid PUR foams or, in the case of a significant proportion of isocyanurate groups, also as rigid polyurethane/polyisocyanurate foams (rigid PUR/PIR foams).

The production of such rigid foams is described, for example, in the Kunststoff-Handbuch, Volume VII, "Polyurethane", 3rd Edition edited by Gunter Oertl, Carl-Hanser-Verlag, Munich, Vienna, 1993.

In order to obtain very fine-celled rigid polyurethane foams, it is advantageous to emulsify the blowing agent in the polyurethane formative components.

EP-A-351 614 describes a process for producing polyurethane foams in which perfluorinated hydrocarbons which are emulsified in at least one of the polyurethane formative components are used as blowing agent. DE-A-41 43 148 describes blowing agent-containing emulsions of isoalkanes having at least 6 carbon atoms and low-boiling fluorinated or perfluorinated organic compounds. DE-A-42 00 558 describes the combination of fluorine compounds with hydrocarbons having from 4 to 8 carbon atoms, including cyclopentane. DE-A-41 21 161 also describes emulsions comprising fluorinated blowing agents.

The emulsion foams produced using these emulsions have very small cells which lead to low thermal conductivities. An important prerequisite for producing these emulsions is the concomitant use of at least one highly fluorinated and/or perfluorinated compound, if desired together with other blowing agents, for example hydrocarbons.

Further variants of emulsion foams are described, for example, in EP-A-405 439, WO 96/25455, U.S. Pat. No. 5,346,928 or EP-A-662 494, with the object being the provision of open-celled foams for vacuum technology.

WO 95/02620 describes the production of fine- and open-celled foams for vacuum technology by the emulsion method, where the emulsion is prepared with the aid of an inert organic liquid which is insoluble in the polyurethane formative components and is present as disperse phase of a microemulsion. As inert organic liquids, use is again made of highly fluorinated or perfluorinated compounds. All these publications indicate the importance of fluorinated compounds for emulsion formation.

Although the ozone depletion potential (ODP) of these compounds is zero, the fluorine compounds contribute considerably to the global warming potential (GWP). In addition, these compounds decompose in the atmosphere into acidic and environmentally damaging decomposition products, in particular hydrogen fluoride.

A halogen-free emulsion foam is described in EP-A-394 769. It comprises at least one polyester alcohol, an emulsifier and finely divided nitrogen. JP 08/193115 describes a halogen-free emulsion comprising a polyesterol and a prepolymer derived from a polyetherol and isocyanate. DE-A-43 28 383 describes a polyol component comprising an only partially dissolved hydrocarbon blowing agent which is present as an emulsion. The polyol component here comprises at least one polyether alcohol containing oxyethylene groups and at least one polyether alcohol which is free of oxyethylene groups. A disadvantage here is the high intrinsic reactivity of the polyether alcohols comprising oxyethylene groups. This makes it necessary to use less catalyst to set a desired fiber time, as a result of which the reaction proceeds more slowly after reaching the fiber time and the foam cures less well. As a result, demolding times for foaming in molds are undesirably long or working speeds in the double belt process are low. In addition, the emulsions described there have only a very short shelf life.

U.S. Pat. No. 5,488,071, U.S. Pat. No. 5,484,817 and U.S. Pat. No. 5,464,562 propose monofunctional polyoxyalkylene polyetherols with fatty alcohols as initiator substances as emulsifiers and polyester alcohols as polyol components. However, these emulsions too have only insufficient storage stability. In addition, the use of monofunctional emulsifiers greatly reduces the total functionality of the polyol mixture. This results in reduced crosslinking of the foam with all its associated disadvantages such as impaired curing of the reaction mixture and poorer thermal stability of the rigid foam. When non-functional emulsifiers such as benzyl n-butylphthalate are used as described in DE-A-41 09 076, the adhesion of the polyurethane to covering layers and also the thermal stability of the foam are considerably worsened.

It is an object of the present invention to prepare storage-stable halogen-free emulsions for producing rigid foams based on isocyanate comprising hydrocarbons as blowing agents, which emulsions can be processed into rigid foams having improved properties, eg. improved thermal stability, and also with good curing of the reaction mixture.

We have found that this object is achieved by concomitant use of polyether alcohols having a functionality of greater than 1.5 and a hydroxyl number of from 10 to 100 mg KOH/g as reactive emulsion stabilizers in the polyol component.

The present invention accordingly provides a storage-stable, halogen-free emulsions comprising
  a) compounds containing hydrogen atoms which are reactive toward isocyanate groups,
  b) water,
  c) physically acting, halogen-free blowing agents and, if desired,
  d) auxiliaries and/or additives which are customary in polyurethane chemistry,
wherein the component a) comprises polyether alcohols having a functionality of greater than 1.5 and a hydroxyl number of from to 100 mg KOH/g in an amount of from 0.2% by mass to 80% by mass, based on the mass of the component a), and the halogen-free, physically acting blowing agents c) used are hydrocarbons having from 3 to 10 carbon atoms.

The invention further provides a process for producing rigid foams based on isocyanate by reacting the emulsions with polyisocyanates and also provides rigid foams based on isocyanate produced by this process.

The polyether alcohols used according to the present invention preferably have a functionality of from 2.5 to 3.5 and a hydroxyl number of from 25 mg KOH/g to 50 mg KOH/g and are used, in particular, in an amount of from 1 to 50% by mass, based on the mass of the component a).

As physically acting blowing agents c), preference is given to using pentanes, in particular cyclopentane. The amount of the physically acting blowing agents is from at least 5% by mass to at most 25% by mass, preferably from 12% by mass to 21% by mass, in each case based on the sum of the components a) to d).

The amount of water b) is from 0.01% by mass to 5% by mass, preferably from 0.35% by mass to 2% by mass and in particular from 0.5% by mass to 1.5% by mass, in each case based on the sum of the components a) to d).

It has been found to be particularly advantageous to use polyether alcohols which are prepared by addition of ethylene oxide and/or propylene oxide onto glycerol or trimethylolpropane (TMP). The distribution of the alkylene oxide in the polyether chain can here be in blocks or be random, with a terminal ethylene oxide block frequently being added on at the end of the chain.

The polyether alcohols used according to the present invention are usually soluble in the reaction mixture, but in exceptional cases may also be insoluble. The emulsions of the present invention usually have a milky turbidity, but can also appear transparent to the naked eye. Emulsification can be carried out by metering the physically acting blowing agents c) into the mixture of the components a), b) and d). The emulsions have a shelf life of several weeks. It is also possible to carry out emulsification by adding the component c) to the components a), b) and d) in the mixing head or just before the mixing head of a metering unit immediately prior to foaming.

It is surprising that stable blowing agent-containing emulsions can be obtained by the use according to the present invention of polyether alcohols as are customarily used in the production of flexible polyurethane foams.

The emulsions can be reacted with the customary polyisocyanates to give rigid foams based on isocyanate. The polyisocyanates employed are preferably diphenylmethane diisocyanate (MDI) and mixtures of MDI with polyphenylpolymethylene polyisocyanates (crude MDI).

As regards the individual constituents of the emulsions, the following details may be provided.

As compounds a) containing hydrogen atoms which are reactive toward isocyanate groups, use is made of, apart from the above-described polyether alcohols, further NH-, $NH_2$-, but in particular OH-functional compounds. In the case of the OH-functional compounds, particular preference is given to using polyetherols and/or polyesterols. The polyetherols are prepared by addition of lower alkylene oxides, preferably ethylene oxide and/or propylene oxide, onto OH- and/or NH-functional initiator substances. OH-functional initiator substances used for the emulsions of the present invention preferably have four or more OH groups in the molecule. Examples of such initiator substances are sugar alcohols such as sucrose, sorbitol, xylitol, mannitol or phenol-formaldehyde condensates, known as novolaks. Examples of NH-functional initiator substances are aliphatic and preferably aromatic amines such as tolylenediamine (TDA), diphenylmethanediamine (MDA), if desired in admixture with poly-MDA.

Preference is given to the concomitant use of polyester alcohols. These are prepared, in particular, by condensation of polyfunctional carboxylic acids with polyfunctional alcohols.

To produce somewhat more flexible rigid foams, use is made, in particular, of polyester alcohols based on aromatic polyacids or acids which have double bonds in the molecule, particularly preferably polyesterols which have both types of acid in the molecule.

Furthermore, amine-functional and in particular hydroxyl-functional chain extenders and/or crosslinkers can be used. These are usually bifunctional or higher-functional alcohols having molecular weights in the range from 62 to about 400.

Apart from the above-described hydrocarbons as physically acting blowing agents c), it is also possible to use further halogen-free blowing agents, for example methyl formate, methylal, low molecular weight alcohols, diethyl ether, acetone or the like.

As auxiliaries and/or additives d) which may be used if desired, use is made of the customary and known catalysts, cell regulators, stabilizers, flame retardants and/or fillers.

Further details regarding the components may be found, for example, in the Kunststoff-Handbuch, Volume VII, "Polyurethane", edited by Dr. Günter Oertl, 3rd Edition, 1993, Carl-Hanser-Verlag, Munich.

The emulsions of the present invention are stable on storage for days, weeks and even months. They can be used without problems on the conventional machines for producing polyurethane.

The invention is illustrated by the following examples.

Raw Materials Used

Polyols

Polyol 1:

Prepared from 25.2 parts of sorbitol and 74.8 parts of propylene oxide using potassium hydroxide as catalyst and 0.5 parts of water as coinitiator. The hydroxyl number (OH number or OHN) is 495 mg KOH/g, the viscosity at 20° C. is 17,900 mpas. Functionality: 5.

Polyol 2:

Prepared from sucrose/glycerol/water and propylene oxide. The hydroxyl number is 490 mg KOH/g, the viscosity at 20° C. is 8000 mpas. Functionality: 4.3.

Polyol 3:

Prepared from sucrose (1 part), pentaerythritol (1 part), diethylene glycol (2 parts), water as coinitiator and propylene oxide using potassium hydroxide as catalyst. The hydroxyl number is 400 mg KOH/g, the viscosity at 20° C. is 2200 mPas.

Polyol 4:

Prepared from 28% of a mixture of 2,3- and 3,4-tolylenediamine, 22% of ethylene oxide and 50% of propylene oxide using potassium hydroxide as catalyst. The hydroxyl number is 395 mg KOH/g, the viscosity at 200° C. is 8176 mpas.

Polyol 5:

Polyester alcohol, prepared from adipic acid/phthalic anhydride/oleic acid in a ratio of 1:2:1 and 1,1,1-trimethylolpropane to give a number average molar mass of 530 g/mol. The hydroxyl number is 385 mg KOH/g, the viscosity at 75° C. is 1370 mPas.

Polyol 5a:

Polyester alcohol derived from glycerol and castor oil and having a hydroxyl number of 500 mg KOH/g.

Polyols 6:

Polyol 6a:

Prepared from glycerol as initiator and propylene oxide as first block and ethylene oxide as terminal block. The hydroxyl number is 35 mg KOH/g, the viscosity at 20° C. is 850 mPas. The mass ratio of propylene oxide to ethylene oxide is 6.4.

Polyol 6b:

Prepared from trimethylolpropane as initiator and propylene oxide as first block and ethylene oxide as terminal block. The hydroxyl number is 26.5 mg KOH/g, the viscosity at 20° C. is 1225 mPas. The mass ratio of propylene oxide to ethylene oxide is 3.7.

Polyol 6c:

Prepared from glycerol as initiator and propylene oxide as first block and ethylene oxide as terminal block. The hydroxyl number is 28 mg KOH/g, the viscosity at 20° C. is 1130 mpas. The mass ratio of propylene oxide to ethylene oxide is 6.1.

Polyol 6d:

Prepared from propylene glycol as initiator and propylene oxide. The hydroxyl number is 55 mg KOH/g, the viscosity at 20° C. is 325 mpas.

Polyol 6e:

Prepared from an initiator mixture of lignin and monoethylene glycol using ethylene oxide as first block and propylene oxide as terminal block. The hydroxyl number is 50 mg KOH/g, the viscosity at 20° C. is 850 mPas.

Polyol 6f:

Prepared from propylene glycol as initiator using propylene oxide as first block and ethylene oxide as terminal block. The hydroxyl number is 29 mg KOH/g, the viscosity at 20° C. is 780 mPas. The mass ratio of propylene oxide to ethylene oxide is 4.4.

Polyol 7:

Prepared from trimethylolpropane and ethylene oxide, the hydroxyl number is 590 mg KOH/g.

Isocyanate 1:

Polyisocyanate Lupranat® M 20 (BASF AG), a mixture of diphenylmethane diisocyanate and polyphenylpolymethylene polyisocyanates having an NCO content of 31.7% and a viscosity of 209 mPas at 25° C.

Isocyanate 2:

Polyisocyanate Lupranat® M 50 (BASF AG), a mixture of diphenylmethane diisocyanate and polyphenylpolymethylene polyisocyanates having an NCO content of 31.5% and a viscosity of 550 mPas at 25° C.

Isocyanate 3:

Polyisocyanate Lupranat® M 200 (BASF AG), a mixture of diphenylmethane diisocyanate and polyphenylpolymethylene polyisocyanates having an NCO content of 30.5% and a viscosity of 2200 mPas at 25° C.

Unless indicated otherwise, parts are by weight.

Preparation and Assessment of the Emulsion:

160 ml of the emulsion of hydrogen-active compounds, stabilizers, catalysts and the hydrocarbon as physically acting blowing agent, for example cyclopentane, are, after mixing, poured into a test tube having a diameter of 3 cm and a height of 20 cm, closed with a stopper and allowed to stand at room temperature. The formation of any separate phases is observed as a function of time.

Preparation and Testing of the Rigid Polyurethane or Polyurethane/Polyisocyanurate Foams:

Foaming in a Cup:

A and B components were thermostatted to 20° C.+0.5 K. 78 g of the A and B components were mixed in a cardboard cup having a capacity of about 660 ml for 10 seconds at 1750 rpm. using a laboratory stirrer from Vollrath, diameter 65 mm. The ratio of A to B component corresponded to the respective formulation. The A component was a premix of the polyols and auxiliaries used and the blowing agent, while the B component consisted of the polyisocyanate. The cream time, rise time and fiber time were measured in a known manner on the rising foam, and the foam density, also referred to as the density in the tables, was measured in a known manner on the cured foam. The fineness of the cells was compared visually and estimated as "fine-celled" (FC) and "very fine-celled" (VFC). Comparison with microscopic measurements shows that the cell diameter for "FC" is from 300 $\mu$m to 400 $\mu$m and for "VFC" is less than 250 $\mu$m.

Production of Rigid Foam Moldings and Their Testing

Mixing was carried out using a PUROMAT® HD 30 high-pressure foaming machine from Elastogran. Other machines are indicated separately. The mixing ratio was set so as to correspond to the formulation. 576 g of the mixture of A component and isocyanate leaving the mixing head were poured into a mold heated to 45° C. and having the dimensions 300 mm×400 mm×80 mm (9.6 1 mold), which was subsequently closed tightly. The foam was formed with a compaction of from 1.1 to 2.0. The overall density of the molding was then 60±1 kg/m$^3$. In other variants, an overall density of 70±1 kg/m$^3$ or 80±1 kg/m$^3$ was set by weighing 672 g or 768 g of the foaming mixture into the same mold, with the compaction being from 1.5 to 2. The NCO index, viz. the molar ratio of NCO to hydrogen-active groups, and the fiber time were kept constant for comparative examples and examples according to the present invention.

For some of the PUR/PIR formulations, 2.5-liter aluminum pressure flasks were charged with 250 g of the foaming mixture (corresponds to an overall density of 100 kg/m$^3$), closed tightly and stored at 200° C. for 4 weeks, sometimes at 220° C. for 2 weeks (flask test). The foam was then assessed visually. In manual foaming tests similar to foaming in a cup, correspondingly smaller aluminum flasks having a volume of 0.5 1 were used with 50 g of mixture.

The following tables show the results of foaming tests according to the present invention compared to examples which are not according to the present invention.

EXAMPLES 1 TO 6

Rigid PUR Foam Formulations (foaming in a cup)

Stabilizer from Goldschmidt

Catalyst: Mixture of tertiary amines

| Example | 1 (C) | 2 | 3 | 4 | 5 | 6 |
|---|---|---|---|---|---|---|
| Polyol 1 | 57.3 | 57.3 | 57.3 | 57.3 | 57.3 | 57.3 |
| Polyol 3 | 30.0 | 30.0 | 30.0 | 30.0 | 30.0 | 30.0 |
| Dipropylene glycol | 6.0 | 6.0 | 6.0 | 6.0 | 6.0 | 6.0 |
| Glycerol | 2.0 | 2.0 | 2.0 | 2.0 | 2.0 | 2.0 |
| Stabilizer B8423 | 1.5 | 1.5 | 1.5 | 1.5 | 1.5 | 1.5 |
| Catalyst | 2.3 | 2.3 | 2.3 | 2.3 | 2.3 | 2.3 |
| Water | 0.9 | 0.9 | 0.9 | 0.9 | 0.9 | 0.9 |
| Total | 100.0 | 100.0 | 100.0 | 100.0 | 100.0 | 100.0 |
| Cyclopentane | 17.5 | 17.5 | 17.5 | 17.5 | 17.5 | 17.5 |
| Polyol 6a | | 1.0 | | | | |
| Polyol 6b | | | 1.0 | | | |
| Polyol 6c | | | | 1.0 | | |
| Polyol 6d | | | | | 1.0 | |
| Polyol 6e | | | | | | 1.0 |
| Isocyanate 1 | 143.0 | 143.0 | 143.0 | 143.0 | 143.0 | 143.0 |
| Cream time in sec | 12 | 11 | 11 | 11 | 11 | 10 |
| Fiber time in sec | 65 | 62 | 60 | 61 | 63 | 61 |
| Rise time in sec | 115 | 111 | 116 | 112 | 114 | 110 |
| Density in kg/m$^3$ | 27.6 | 27.6 | 27.6 | 27.6 | 27.6 | 27.6 |
| Stability of emulsion | | | | | | |
| Immediate | E | E | E | E | E | E |
| After 4 h | PP | E | E | E | E | E |
| After 1 day | PP | E | E | E | E | E |
| After 7 days | PC | PP | PP | E | PP | E |
| After 3 weeks | PC | PP | PP | PP | PP | PP |
| Foam structure | FC | FC | FC | VFC | FC | VFC |

C = Comparative experiment,
E = Emulsion without phase separation,
PP = Phase separation, partially,
PC = Phase separation, complete,
FC = Fine-celled,
VFC = very fine-celled according to visual estimation, reaction times in the freshly emulsified state.

The parts indicated in the table are by mass.

EXAMPLES 7 TO 12

Rigid PUR Foam Formulations (foaming in a cup)

Stabilizer from Goldschmidt;

Catalyst: Mixture of tertiary amines;

C = Comparative example, E = Emulsion without phase separation,
PP = Phase separation, partially, PC = Phase separation, complete,
FC = Fine-celled,
VFC = Very fine-celled according to visual estimation, reaction times in the freshly emulsified state.

Using polyol 7 in place of polyol 4 in Example 7 gives an emulsion corresponding to DE-A-4328383, but this breaks after 1 hour.

| Example | 7 (C) | 8 | 9 | 10 | 11 | 12 |
|---|---|---|---|---|---|---|
| Polyol 1 | 57.3 | 57.3 | 57.3 | 57.3 | 57.3 | 57.3 |
| Polyol 4 | 30.0 | 30.0 | 30.0 | 30.0 | 30.0 | 30.0 |
| Dipropylene glycol | 6.0 | 6.0 | 6.0 | 6.0 | 6.0 | 6.0 |
| Glycerol | 2.0 | 2.0 | 2.0 | 2.0 | 2.0 | 2.0 |
| Stabilizer B8423 | 1.5 | 1.5 | 1.5 | 1.5 | 1.5 | 1.5 |
| Catalyst | 2.3 | 2.3 | 2.3 | 2.3 | 2.3 | 2.3 |
| Water | 0.9 | 0.9 | 0.9 | 0.9 | 0.9 | 0.9 |
| Total | 100.0 | 100.0 | 100.0 | 100.0 | 100.0 | 100.0 |
| Cyclopentane | 17.5 | 17.5 | 17.5 | 17.5 | 17.5 | 17.5 |
| Polyol 6a | | 1.0 | | | | |
| Polyol 6b | | | 1.0 | | | |
| Polyol 6c | | | | 1.0 | | |
| Polyol 6d | | | | | 1.0 | |
| Polyol 6e | | | | | | 1.0 |
| Isocyanate 1 | 143.0 | 143.0 | 143.0 | 143.0 | 143.0 | 143.0 |
| Cream time in sec | 10 | 10 | 10 | 10 | 11 | 10 |
| Fiber time in sec | 65 | 61 | 61 | 60 | 62 | 60 |
| Rise time in sec | 110 | 100 | 98 | 100 | 98 | 97 |
| Density in kg/m$^3$ | 27.4 | 28.2 | 28.5 | 28.9 | 27.7 | 28.2 |
| Stability of emulsion | | | | | | |
| Immediate | E | E | E | E | E | E |
| After 4 h | E | E | E | E | E | E |
| After 1 day | PP | E | E | E | E | E |
| After 7 days | PC | E | E | PP | E | E |
| After 3 weeks | PC | PP | PP | PP | PP | E |
| Foam structure | FC | VFC | VFC | VFC | VFC | FC |

EXAMPLES 13 TO 18

Rigid PUR Foam Formulations (foaming in a cup)

Stabilizer from Goldschmidt; catalyst: mixture of tertiary amines;

| Example | 13 (C) | 14 | 15 | 16 | 17 | 18 |
|---|---|---|---|---|---|---|
| Polyol 2 | 57.3 | 57.3 | 57.3 | 57.3 | 57.3 | 57.3 |
| Polyol 4 | 30.0 | 30.0 | 30.0 | 30.0 | 30.0 | 30.0 |
| Dipropylene glycol | 6.0 | 6.0 | 6.0 | 6.0 | 6.0 | 6.0 |
| Glycerol | 2.0 | 2.0 | 2.0 | 2.0 | 2.0 | 2.0 |
| Stabilizer B8423 | 1.5 | 1.5 | 1.5 | 1.5 | 1.5 | 1.5 |
| DMCHA | 2.3 | 2.3 | 2.3 | 2.3 | 2.3 | 2.3 |
| Water | 0.9 | 0.9 | 0.9 | 0.9 | 0.9 | 0.9 |
| Total | 100.0 | 100.0 | 100.0 | 100.0 | 100.0 | 100.0 |
| Cyclopentane | 17.5 | 17.5 | 17.5 | 17.5 | 17.5 | 17.5 |
| Polyol 6a | | 1.0 | | | | |
| Polyol 6b | | | 1.0 | | | |
| Polyol 6c | | | | 1.0 | | |
| Polyol 6d | | | | | 1.0 | |
| Polyol 6e | | | | | | 1.0 |
| Isocyanate 1 | 143.0 | 143.0 | 143.0 | 143.0 | 143.0 | 143.0 |
| Cream time in sec | 10 | 11 | 10 | 11 | 11 | 10 |
| Fiber time in sec | 65 | 63 | 62 | 60 | 62 | 60 |
| Rise time in sec | 110 | 102 | 98 | 101 | 97 | 99 |
| Density in kg/m$^3$ | 27.6 | 28.3 | 28.8 | 28.4 | 27.9 | 28.5 |
| Stability of emulsion | | | | | | |
| Immediate | E | E | E | E | E | E |
| After 4 h | E | E | E | E | E | E |
| After 1 day | E | E | E | E | E | E |
| After 7 days | PC | E | PP | PP | E | E |
| After 3 weeks | PC | PP | PP | PP | PP | PP |
| Foam structure | FC | FC | FC | FC | VFC | VFC |

C = Comparative experiment,
E = Emulsion without phase separation,
PP = Phase separation, partial,
PC = Phase separation, complete,
FC = Fine-celled,
VFC = very fine-celled according to visual estimation, reaction times in the freshly emulsified state.

EXAMPLES 19 TO 24

Rigid PUR/PIR Foam Formulations (foaming in a cup)

Stabilizer from Goldschmidt,

C = Comparative example, E = Emulsion without phase separation,
PP = Phase separation, partial, PC = Phase separation, complete,
FC = Fine-celled, VFC = Very fine-celled according to visual estimation, reaction times in the freshly emulsified state.

If polyol 1 is replaced by the same amount of polyol 7, the emulsion demixes in 1 hour.

| Example | 19 (C) | 20 | 21 | 22 | 23 | 24 |
|---|---|---|---|---|---|---|
| Polyol 5 | 57.22 | 25.61 | 25.61 | 25.61 | 25.61 | 25.61 |
| Polyol 1 | | 31.61 | | | | |
| Polyol 6a | | | 31.61 | | | |
| Polyol 6b | | | | 31.61 | | |
| Polyol 6c | | | | | 31.61 | |
| Polyol 6d | | | | | | 31.61 |
| Dipropylene glycol | 16.65 | 16.65 | 16.65 | 16.65 | 16.65 | 16.65 |
| Ethylene glycol | 2.72 | 2.72 | 2.72 | 2.72 | 2.72 | 2.72 |
| Stabilizer mixture | 2.56 | 2.56 | 2.56 | 2.56 | 2.56 | 2.56 |
| Water | 0.38 | 0.38 | 0.38 | 0.38 | 0.38 | 0.38 |
| Potassium acetate | 2.41 | 2.41 | 2.41 | 2.41 | 2.41 | 2.41 |
| Tertiary amine | 0.26 | 0.26 | 0.26 | 0.26 | 0.26 | 0.26 |
| Cyclopentane | 17.80 | 17.80 | 17.80 | 17.80 | 17.80 | 17.80 |
| Total | 100.0 | 100.0 | 100.0 | 100.0 | 100.0 | 100.0 |
| Isocyanate 1 | 300.0 | 300.0 | 300.0 | 300.0 | 300.0 | 300.0 |
| Cream time in sec | 17 | 15 | 18 | 19 | 17 | 18 |
| Fiber time in sec | 26 | 25 | 29 | 29 | 29 | 28 |
| Rise time in sec | 40 | 39 | 43 | 44 | 43 | 42 |
| Foam density in kg/m$^3$ | 70 | 66 | 64.9 | 63 | 68 | 66 |
| Stability of emulsion | | | | | | |
| Immediate | E | E | E | E | E | E |
| After 4 h | E | E | E | E | E | E |
| After 1 day | E | E | E | E | E | E |
| After 7 days | PC | PP | E | E | E | E |
| After 3 weeks | PC | PC | E | E | E | E |
| After 2 months | — | — | E | E | PP | PC |
| Foam structure | FC | FC | VFC | VFC | VFC | VFC |

EXAMPLES 25 TO 27

Rigid PUR/PIR Foam Formulations (foaming in a cup/manual mixing for flask test)

Stabilizer from Goldschmidt,

C = Comparative example, E = Emulsion without phase separation,
PP = Phase separation, partial, PC = Phase separation, complete,
FC = Fine-celled, VFC = Very fine-celled according to visual estimation, reaction times in the freshly emulsified state.

| Example | 25 (C) | 26 | 27 |
|---|---|---|---|
| Polyol 5 | 57.22 | 25.61 | 25.61 |
| Polyol 6a | | 31.61 | 31.61 |
| Dipropylene glycol | 16.65 | 16.65 | 16.65 |
| Ethylene glycol | 2.72 | 2.72 | 2.72 |
| Stabilizer mixture | 2.56 | 2.56 | 2.56 |
| Water | 0.38 | 0.38 | 0.38 |
| Potassium acetate | 2.41 | 2.41 | 2.41 |
| Tertiary amine | 0.26 | 0.26 | 0.26 |
| Total | 100.0 | 100.0 | 100.0 |
| R 11 | 56.3 | | |
| Isopentane | | 17.0 | |
| Cyclopentane | | | 17.0 |
| Isocyanate 1 | 390.0 | 390.0 | 390.0 |
| Cream time in sec | 17 | 13 | 18 |
| Fiber time in sec | 28 | 23 | 23 |
| Rise time in sec | 39 | 39 | 36 |
| Foam density in kg/m$^3$ | 51 | 52 | 70 |
| Stability of emulsion | | | |
| Immediate | E | E | E |
| After 4 h | E | E | E |
| After 1 day | PP | E | E |
| After 7 days | PC | E | E |
| After 3 weeks | PC | PC | E |
| Foam structure | FC | FC | VFC |
| Flask test 2 weeks, 200° C. | Foam destroyed, black | Foam light-colored, firm, 1 crack | Foam light-colored, firm |

We claim:

1. A storage-stable, blowing agent-containing halogen-free emulsion for producing rigid foams based on isocyanate, comprising
   a) compounds containing hydrogen atoms which are reactive toward isocyanate groups,
   b) water,
   c) physically acting, halogen-free blowing agents and, optionally,
   d) auxiliaries and/or additives,
wherein the component a) comprises at least one emulsion stabilizing polyether alcohol having a functionality of from 2.5 to 3.5 and a hydroxyl number of from 10 to 100 mg KOH/g in an amount of from 0.2% by mass to 80% by mass, based on the mass of the component a) and at least one other polyol having a hydroxyl number greater than 300 mg KOH/g, and the halogen-free, physically acting blowing agents c) comprise hydrocarbons having from 3 to 10 carbon atoms.

2. A storage-stable, blowing agent-containing halogen-free emulsion as claimed in claim 1, wherein said at least one emulsion stabilizing polyether alcohol has a hydroxyl number of from 25 mg KOH/g to 50 mg KOH/g.

3. A storage-stable, blowing agent-containing halogen-free emulsion as claimed in claim 1, wherein said at least one emulsion stabilizing polyether alcohol is used in an amount of from 1 to 50% by mass, based on the mass of the component a).

4. A storage-stable, blowing agent-containing halogen-free emulsion as claimed in claim 1, wherein said at least one emulsion stabilizing polyether alcohol is prepared by addition of ethylene oxide and/or propylene oxide onto glycerol and/or trimethylolpropane.

5. A storage-stable, blowing agent-containing halogen-free emulsion as claimed in claim 1, wherein the physically acting blowing agents are used in an amount of at least 5% by weight, based on the weight of the components a) to d).

6. A storage-stable, blowing agent-containing halogen-free emulsion as claimed in claim 5, wherein the physically acting blowing agents are used in an amount of at least 10% by weight, based on the weight of the components a) to d).

7. A storage-stable, blowing agent-containing halogen-free emulsion as claimed in claim 5, wherein the physically acting blowing agents are used in an amount of from 10 to 25% by weight, based on the weight of the components a) to d).

8. A storage-stable, blowing agent-containing halogen-free emulsion as claimed in claim 7, wherein the physically acting blowing agents are used in an amount of from 12 to 21% by weight, based on the weight of the components a) to d).

9. A process for producing rigid foams based on isocyanate comprising reacting storage-stable, blowing agent-containing halogen-free emulsions as claimed in any one of claims 1, or 3–8 with polyisocyanates.

10. A rigid foam based on isocyanate comprising the reaction product of a storage-stable, blowing agent-containing halogen-free emulsion as claimed in any one of claims 1, or 3–9 with a polyisocyanate.

* * * * *